(12) United States Patent
Sprague et al.

(10) Patent No.: US 8,237,522 B2
(45) Date of Patent: Aug. 7, 2012

(54) MAGNETICALLY ACTUATED SYSTEM

(75) Inventors: Randall B. Sprague, Hansville, WA (US); Dean R. Brown, Lynnwood, WA (US); Matthew Ellis, Austin, TX (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 13/396,544

(22) Filed: Feb. 14, 2012

(65) Prior Publication Data
US 2012/0146751 A1    Jun. 14, 2012

Related U.S. Application Data

(60) Continuation of application No. 13/090,967, filed on Apr. 20, 2011, now abandoned, which is a division of application No. 12/328,371, filed on Dec. 4, 2008, now abandoned.

(51) Int. Cl.
    *H01H 51/22* (2006.01)
(52) U.S. Cl. ......................................... 335/78; 200/181
(58) Field of Classification Search .................. 335/78; 200/181; 359/223.1–225.1, 290, 291, 298
See application file for complete search history.

(56) References Cited

U.S. PATENT DOCUMENTS

| 5,742,106 | A  |    | 4/1998  | Muraji |
|-----------|----|----|---------|--------|
| 5,872,496 | A  |    | 2/1999  | Asada et al. |
| 6,188,504 | B1 | *  | 2/2001  | Murakami et al. ......... 359/224.1 |
| 6,710,353 | B1 |    | 3/2004  | Loopstra |
| 6,765,706 | B2 | *  | 7/2004  | Tokuda et al. ............. 359/220.1 |
| 6,949,996 | B2 |    | 9/2005  | Matsumoto et al. |
| 7,012,737 | B2 |    | 3/2006  | Iwasaki et al. |
| 7,123,400 | B2 |    | 10/2006 | Murakami et al. |
| 7,256,926 | B2 |    | 8/2007  | Kamiya et al. |
| 7,265,887 | B2 |    | 9/2007  | Orcutt |
| 2002/0118429 | A1 | * | 8/2002 | Miyajima et al. ............. 359/224 |
| 2008/0231930 | A1 |   | 9/2008 | Mizoguchi et al. |
| 2011/0205612 | A1 | * | 8/2011 | Luanava et al. ............ 359/214.1 |

FOREIGN PATENT DOCUMENTS

JP    09-056135    2/1997

OTHER PUBLICATIONS

Microvision, Inc., , "PCT Search Report and Written Opinion", PCT/US2009/065292 Search Report and Written Opinion, corresponding to US case Jul. 2, 2010.

* cited by examiner

*Primary Examiner* — Bernard Rojas
(74) *Attorney, Agent, or Firm* — Kevin D. Wills (57) ABSTRACT

A magnetically actuated system includes a conductor and a magnetic field apparatus to generate a magnetic field. The magnetic field apparatus includes magnets and magnetically permeable materials to focus the magnetic field in areas of the conductor that produce a drive torque when the conductor carries a current.

11 Claims, 13 Drawing Sheets

MAGNETICALLY ACTUATED SYSTEM

RELATED APPLICATIONS

The present application is a continuation of U.S. application Ser. No. 13/090,967, filed Apr. 20, 2011, which is a divisional of U.S. application Ser. No. 12/328,371, filed Dec. 4, 2008, all of which are incorporated herein by reference in their entirety for all purposes.

FIELD

The present invention relates generally to magnetically actuated systems, and more specifically to magnet field generation used in magnetically actuated systems.

BACKGROUND

Magnetic actuation makes use of "Lorentz Forces" in which a force on a current-carrying conductor is related to the current in the conductor and the strength of a magnetic field across the conductor. The force exerted is perpendicular to the direction of the current in the conductor and perpendicular to the magnetic field.

In magnetically actuated systems, power efficiency can be gained by using larger magnets to create a stronger magnetic field. The larger magnets, however, are heavier and increase volume requirements of the resulting system. On the other hand, volume and weight can be reduced by increasing the current in the conductor, but this is at the expense of increased power consumption. Accordingly, one can see that a trade-off exists between power consumption and weight/volume in magnetically actuated systems.

It is desirable to reduce both power consumption and weight/volume in magnetically actuated systems.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
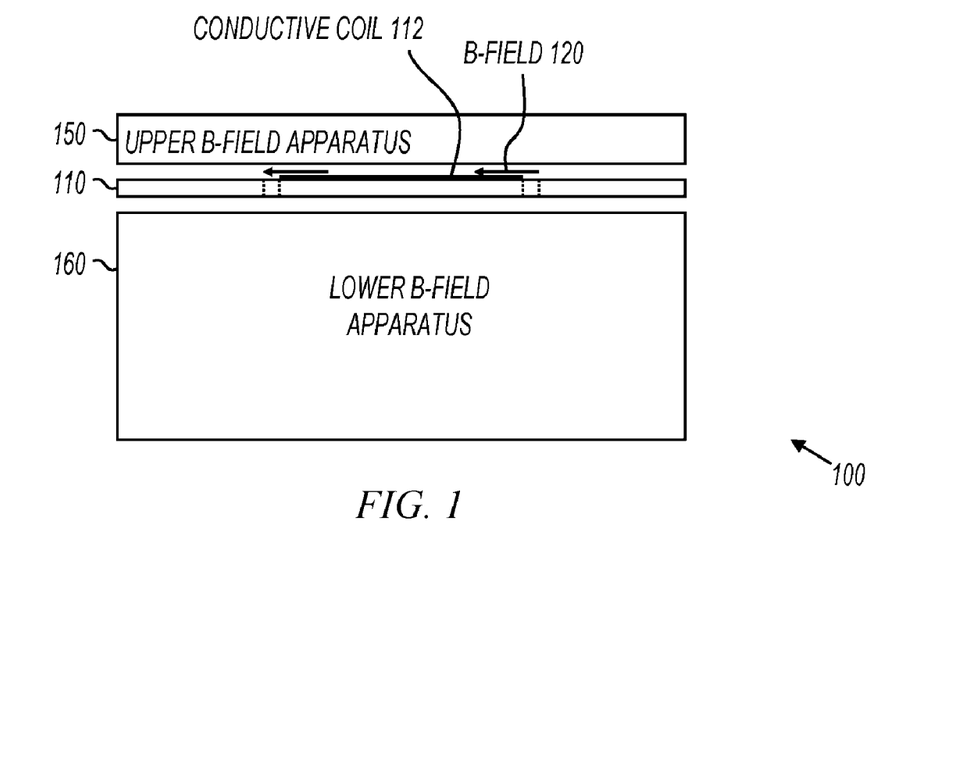
FIG. 1 shows a cross-section of a magnetically actuated system in accordance with various embodiments of the present invention.

FIG. 1 shows a cross-section of a magnetically actuated system in accordance with various embodiments of the present invention. Magnetically actuated system 100 includes lower magnetic field (B-field) apparatus 160, upper B-field apparatus 150, and magnetically actuated device 110. Magnetically actuated device 110 includes a conductive coil seen in cross-section at 112. The upper and lower B-field apparatuses produce a magnetic field across conductive coil 112. The B-field is shown by arrows 120.

In some embodiments, lower B-field apparatus 160 includes multiple magnets having various orientations. These magnets work together to "focus" B-field 120 into an area of the conductive coil where the resulting force will have the greatest effect. In other embodiments, lower B-field apparatus 160 includes multiple magnets and a magnetically permeable core to aid in focusing the resulting B-field.

In some embodiments, upper B-field apparatus 150 includes multiple magnets having various orientations, and in other embodiments, upper B-field apparatus 150 includes multiple magnets and "focusing plates" made of magnetically permeable material. The various embodiments of the present invention combine different permutations of magnets and magnetically permeable materials to focus the B-field in areas of the conductive coil where greater Lorentz forces are desired. These permutations are shown in, and described below with reference to, FIGS. 3-17.

Figure 2:
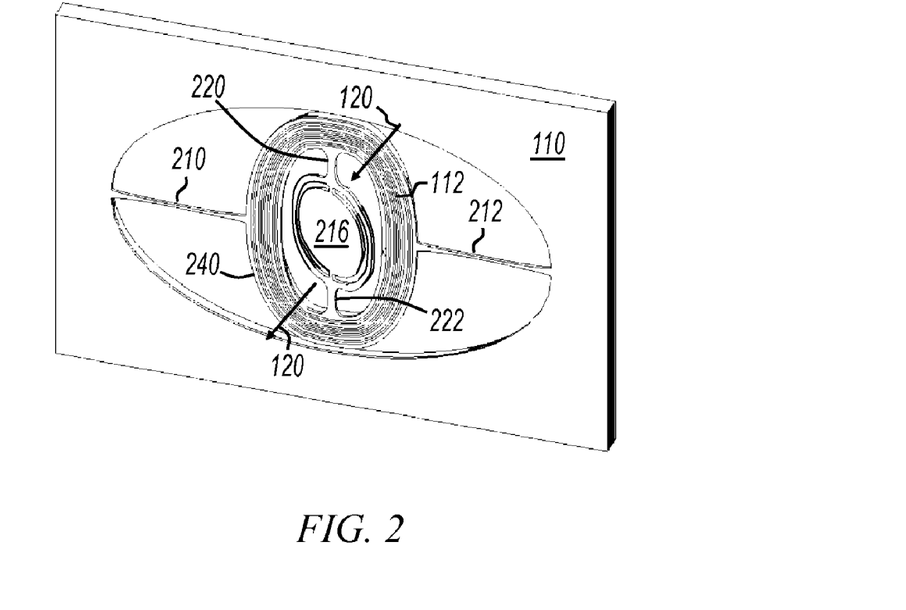
FIG. 2 shows a perspective view of a magnetically actuated device having a movable platform with a conductive coil.

FIG. 2 shows a perspective view of a magnetically actuated device having a movable platform with a conductive coil. Device 110 includes movable platform 240 and mirror 216. In embodiments represented by FIG. 2, movable platform 240 is a gimballed structure coupled to the frame of device 110 by flexures 210 and 212, and mirror 216 is coupled to movable platform 240 by flexures 220 and 222. Movable platform 240 has a conductive coil 112 capable of carrying current. In some embodiments, flexures 210 and/or 212 include conductors to carry current to and from conductive coil 112.

Flexures 210 and 212 allow movable platform 240 to move in one angular dimension (also referred to as a "drive axis"). Likewise, flexures 220 and 222 allow mirror 216 to move on a second drive axis. In embodiments represented by FIG. 2, the two drive axes are 90 degrees apart, but this is not a limitation of the present invention.

In operation, various B-field apparatuses impose a magnetic field 120 on conductive coil 112. The magnetic field imposed on the conductive coil has a component in the plane of the coil, and is oriented at roughly 45° with respect to the two drive axes. The in-plane current in the coil windings interacts with the in-plane magnetic field to produce out-of-plane Lorentz forces on the conductors. Since the drive current forms a loop on movable platform 240, the current reverses sign across the drive axes. This means the Lorentz forces also reverse sign across the drive axes, resulting in a torque in the plane of and normal to the magnetic field. This combined torque produces responses in the two scan directions depending on the frequency content of the torque.

In embodiments represented by FIG. 2, one magnetic field is used to produce angular movement of the mirror on both drive axes. In order to cause movement of platform 240, the B-field 120 has a component perpendicular to, and in the plane of, the conductive coil 112. Furthermore, required drive power can be reduced if the intensity of these in-plane perpendicular B-field vector components are increased. The drive torque is related to the product of the normal component of the magnetic B field and the coil drive current. Thus, a 10% increase in B field will allow a 10% decrease in current. Because the power required to drive the coil current is related to the square of the current, a 10% increase in B field will result in a 21% decrease in drive power.

The various embodiments of the present invention are described relative to the magnetically actuated device shown in FIG. 2. For example, as shown in FIG. 2, the conductive coil is elliptical and on a gimballed movable platform with a mirror having drive axes at substantially 90 degrees to the drive axes of the movable platform. The various embodiments of the invention may be utilized with any magnetically actuated device and are not limited to the device as shown in FIG. 2. For example, magnet assemblies and magnetically actuated systems described below can be utilized to provide a Lorentz force on any conductor having any shape on any movable platform.

Figure 3:
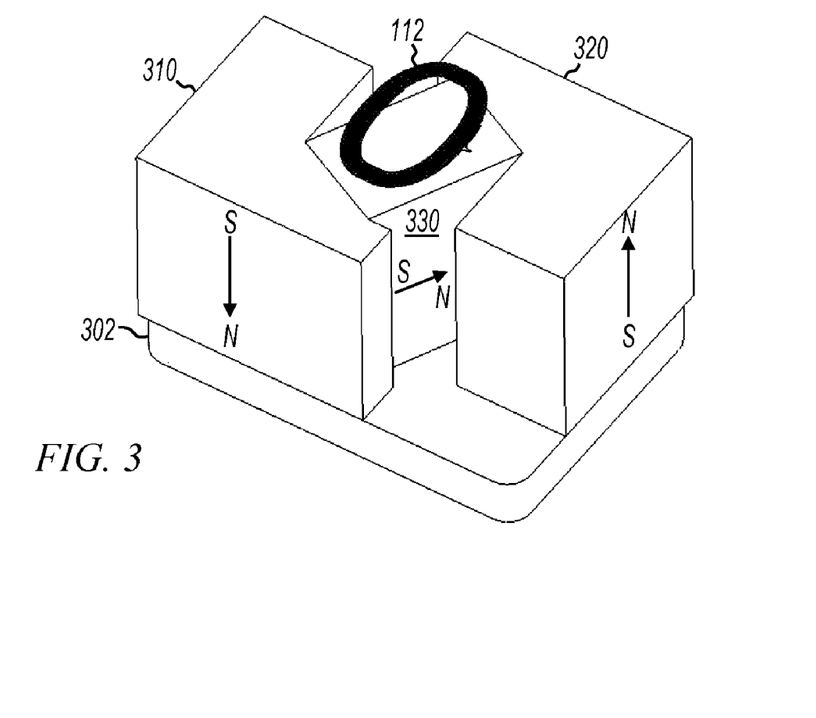
FIGS. 3-5 show perspective views of various magnetically actuated systems with multiple magnets beneath a conductive coil.

FIG. 3 shows a perspective view of a magnetically actuated system with multiple magnets beneath a conductive coil. Conductive coil 112 is shown "floating" above the rest of the assembly to provide a visual indication of where the coil resides in a complete system. The remaining details of the magnetically actuated device (e.g., device 110, FIGS. 1, 2) have been omitted from FIG. 3 so as not to obscure the remainder of the figure. This convention is also followed in many of the remaining figures.

Conductive coil 112 is said to be nominally in a "platform plane." When the conductive coil is at rest, it is in the platform plane, and when it is moving, it may have an angular displacement relative to the platform plane. This terminology has been selected to refer to the plane in which the coil resides, and is not meant to imply any further structural limitations. Further, various embodiments are described using terms such as "above," "below," "up," "down," etc. These terms have been selected to allow the description of relative placement and orientation of components and are not meant to imply any absolute orientation.

Magnets 310, 320, and 330 form a lower B-field apparatus such as lower B-field apparatus 160 (FIG. 1). Magnets 310, 320, and 330 are permanent magnets situated beneath conductive coil 112, and having various magnetic orientations. For example, magnet 310 has a north pole facing down and a south pole facing up; magnet 320 is oriented parallel to magnet 310 with a north pole facing up and a south pole facing down; and magnet 330 is between, and oriented perpendicular to, magnets 310 and 320 with a north pole facing magnet 320 and south pole facing magnet 310. Magnets 310 and 320 are oriented perpendicular to the platform plane, whereas magnet 330 is oriented parallel to the platform plane.

In some embodiments, conductive coil 112 is on a gimballed structure (240, FIG. 2) allowing the conductive coil 112 to rotate relative to the platform plane on a first axis, and the gimballed structure includes a reflective part (mirror 216, FIG. 2) that can rotate relative to the gimballed structure on a second axis.

In some embodiments, magnet 330 is oriented such that it is misaligned with respect to the two axes of the movable platform. For example, as shown in FIG. 3, conductive coil 112 is elliptical in shape with the two drive axes on the major and minor ellipse axes. Magnet 330, however, is oriented such that it does not align with either of the drive axes. By intentionally misaligning magnet 330 with respect to the drive axes, the generated B-field can be positioned to cross the conductive coil at a point in the ellipse where drive torque is needed. See B-field 120 in FIG. 2.

Magnets 310 and 320 are shown generally having an "L" shape, but this is not a limitation of the present invention. In some embodiments, magnets 310 and 320 are triangular, and in other embodiments, magnets 310 and 320 are rectangular. Magnets 310, 320, and 330 are mounted to base plate 302. In some embodiments, base plate 302 is made of a magnetically permeable material to aid in "closing" the magnetic circuit, although this is not a limitation of the present invention.

Figure 4:
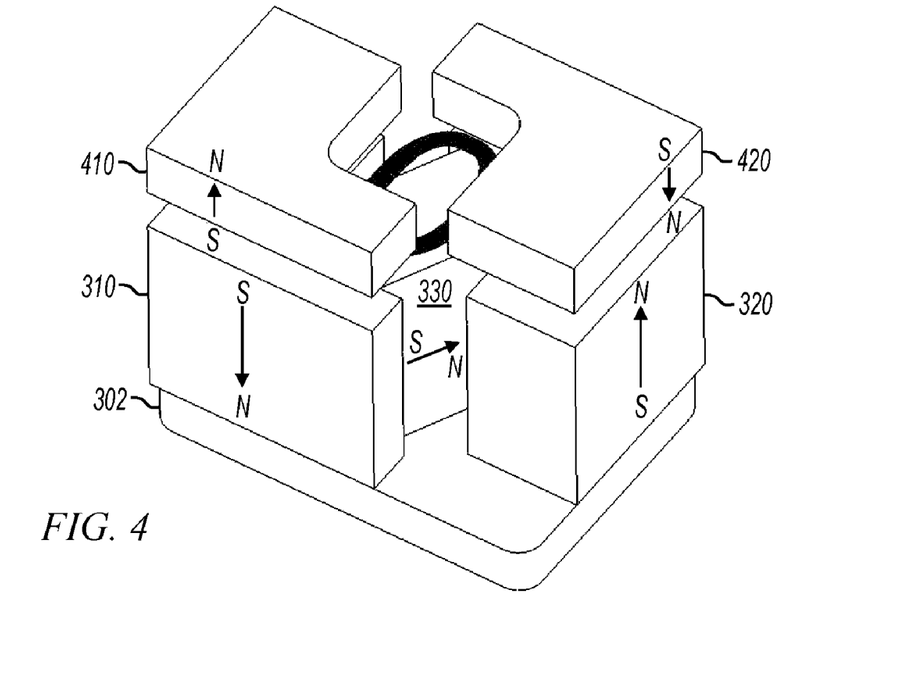

FIG. 4 shows a perspective view of the magnetically actuated system of FIG. 3 with two additional magnets. Magnets 410 and 420 form an upper B-field apparatus such as upper B-field apparatus 150 (FIG. 1). Magnets 410 and 420 are placed above the platform plane with magnetic orientations parallel to the magnetic orientation of magnets 310 and 320. For example, magnet 410 has a south pole facing down and a north pole facing up, and magnet 420 has a north pole facing down and a south pole facing up.

Magnets 410 and 310 form a top/bottom magnet pair with south poles facing each other, and magnets 320 and 420 form a top/bottom magnet pair with north poles facing each other. As shown in later figures, magnetic flux lines emerge from the north poles of magnets 320, 420, and 330, pass through the conductive coil, and enter the south poles of magnets 310, 410, and 330.

Magnets 410 and 420 are oriented to allow light to enter from above. In some embodiments, a reflective part (e.g., mirror 216, FIG. 2) is positioned within conductive coil 112, and is used to reflect the light that enters from above. Magnets 410 and 420 are shown as "L" shaped, but this is not a limitation of the present invention. In some embodiments, any shape that allows light to enter may be used. In other embodiments, for example in magnetically actuated systems not related to light reflection, magnets 410 and 420 may be placed partially or completely above the conductive coil.

Figure 5:
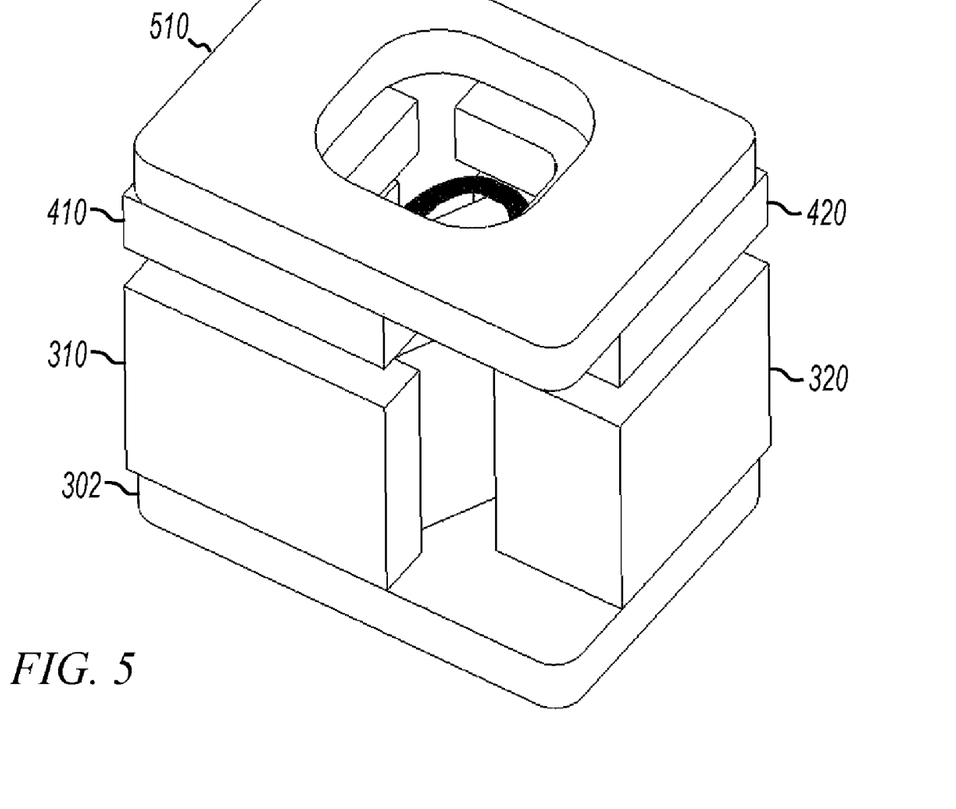

FIG. 5 shows a perspective view of the magnetically actuated system of FIG. 4 with the addition of a top plate. In some embodiments, top plate 510 is made of a magnetically permeable material to aid in "closing" the magnetic circuit, although this is not a limitation of the present invention. Further, top plate 510 includes a hole above the conductive coil to allow light to enter. In embodiments represented by FIG. 5, light can enter through the hole in top plate 510 and be reflected at various angles that depend on a current driven through the conductive coil.

Figure 6:
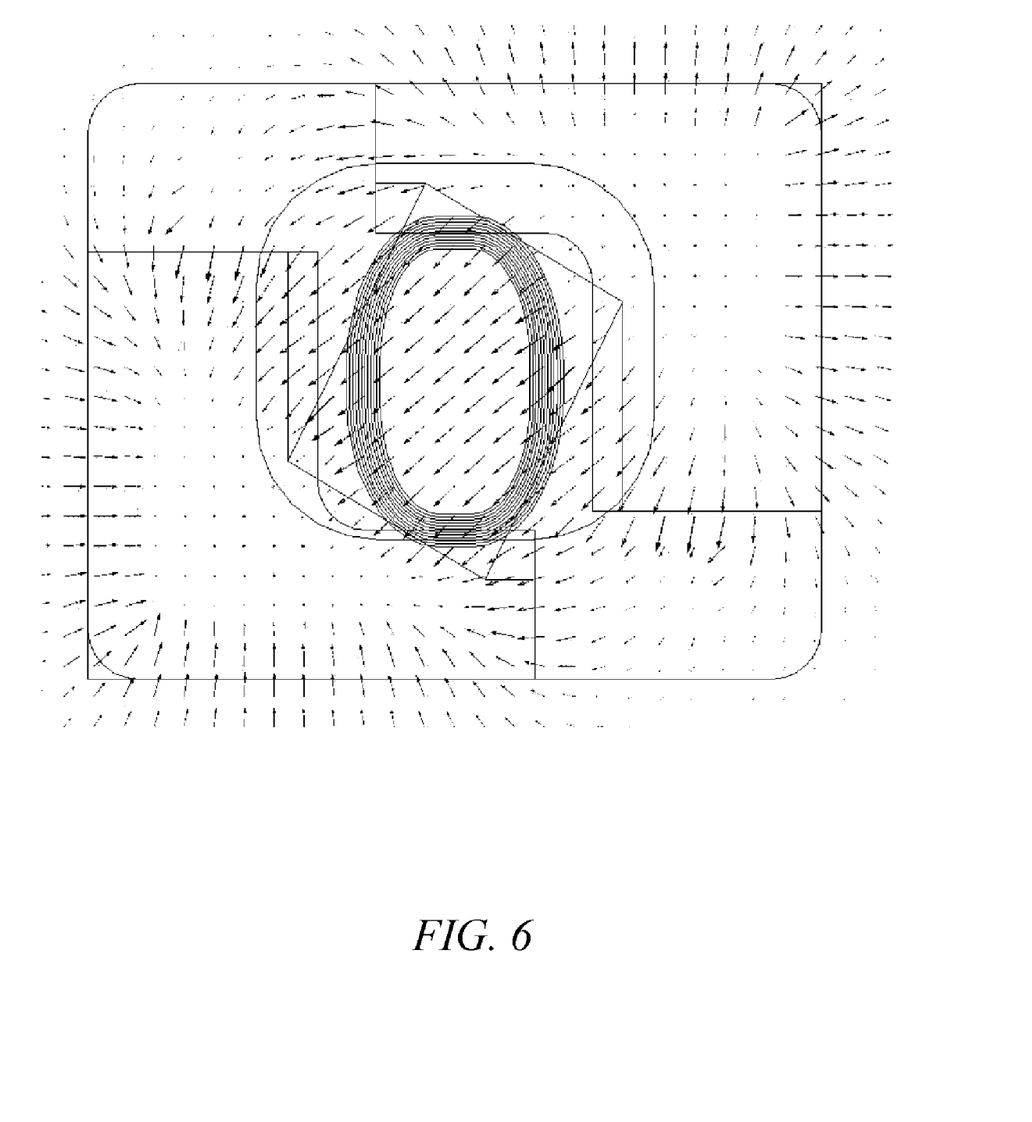
FIGS. 6-8 show magnetic fields in the magnetically actuated system of FIG. 5.
Figure 7:
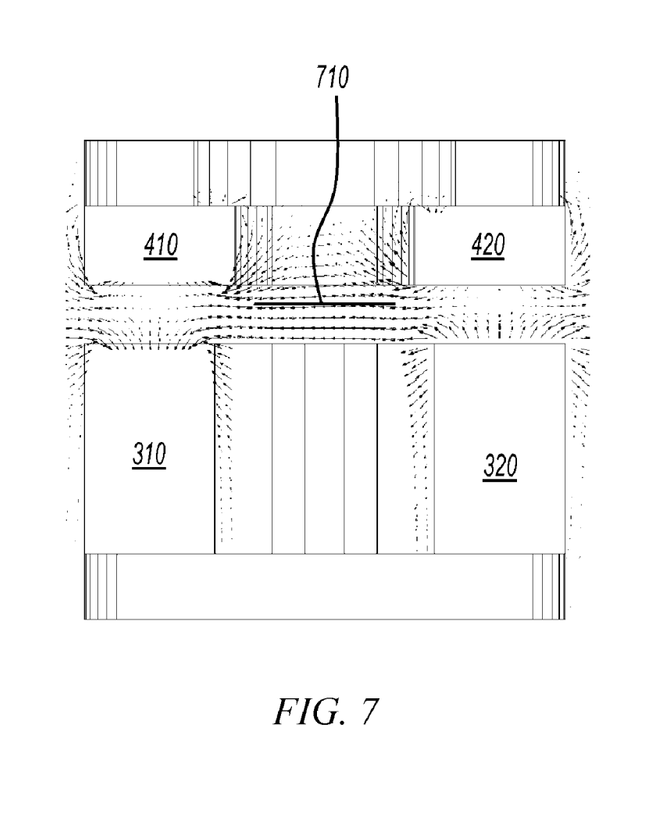
Figure 8:
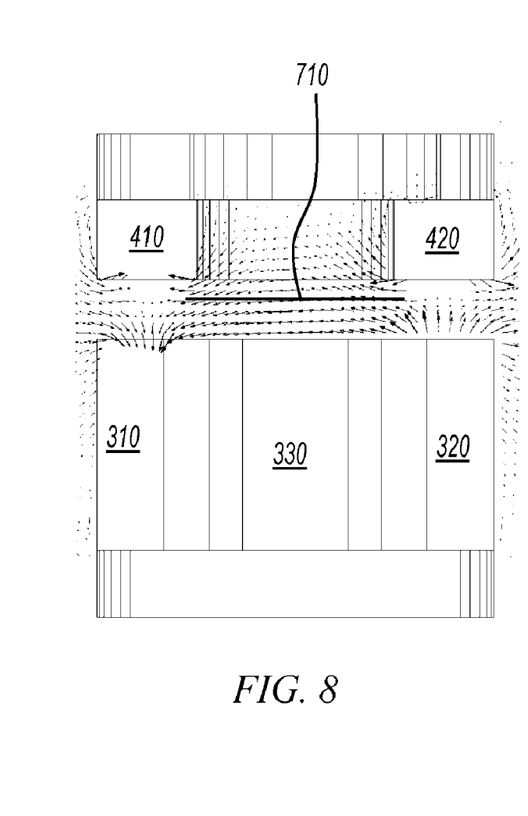

FIGS. 6-8 show magnetic fields in the magnetically actuated system of FIG. 5. FIG. 6 is a top view, and FIGS. 7 and 8 are side views. In the top view of FIG. 6, magnetic flux lines in the platform plane are shown. Accordingly, the arrows show the strength and orientation of the magnetic field that contributes to drive torque. As can be seen by the flux lines in FIG. 6, the magnetic field is focused to provide the greatest drive torque in the upper right corner and lower left corner of the conductive coil. This corresponds to B-field 120 (FIG. 2).

FIGS. 7 and 8 show magnetic flux lines relative to the platform plane. The platform plane is shown at 710. As can be seen in FIGS. 7 and 8, the flux lines are substantially parallel to the platform plane when crossing the conductive coil.

Figure 9:
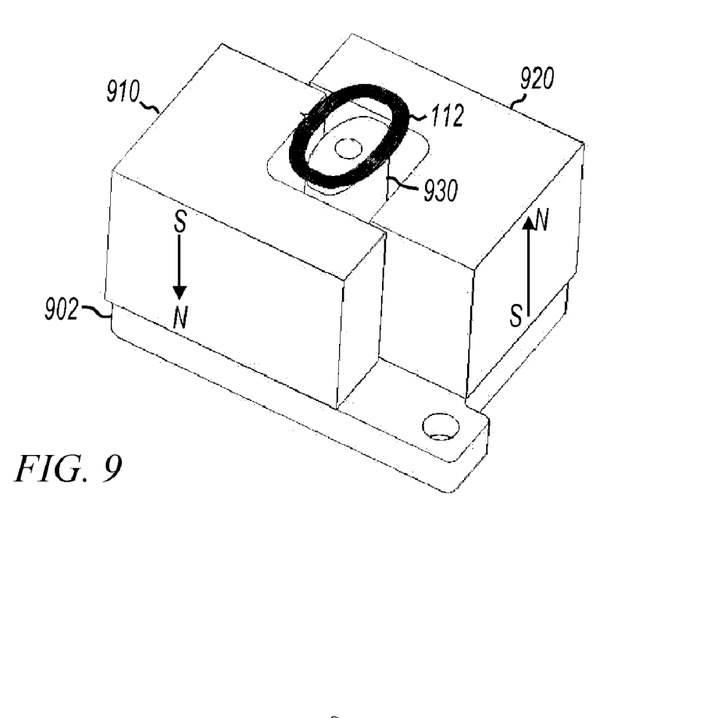
FIGS. 9-11 show perspective views of various magnetically actuated systems with multiple magnets and a magnetically permeable core beneath a conductive coil.

FIG. 9 shows a perspective view of a magnetically actuated system with multiple magnets and a magnetically permeable core beneath a conductive coil. Magnets 910 and 920 and core 930 form a lower B-field apparatus such as lower B-field apparatus 160 (FIG. 1). Magnets 910 and 920 are permanent magnets situated beneath conductive coil 112, and having opposite magnetic orientations. For example, magnet 910 has a north pole facing down and a south pole facing up; and magnet 920 is oriented parallel to magnet 910 with a north pole facing up and a south pole facing down. Magnets 910 and 920 are oriented perpendicular to the platform plane.

Figure 15:
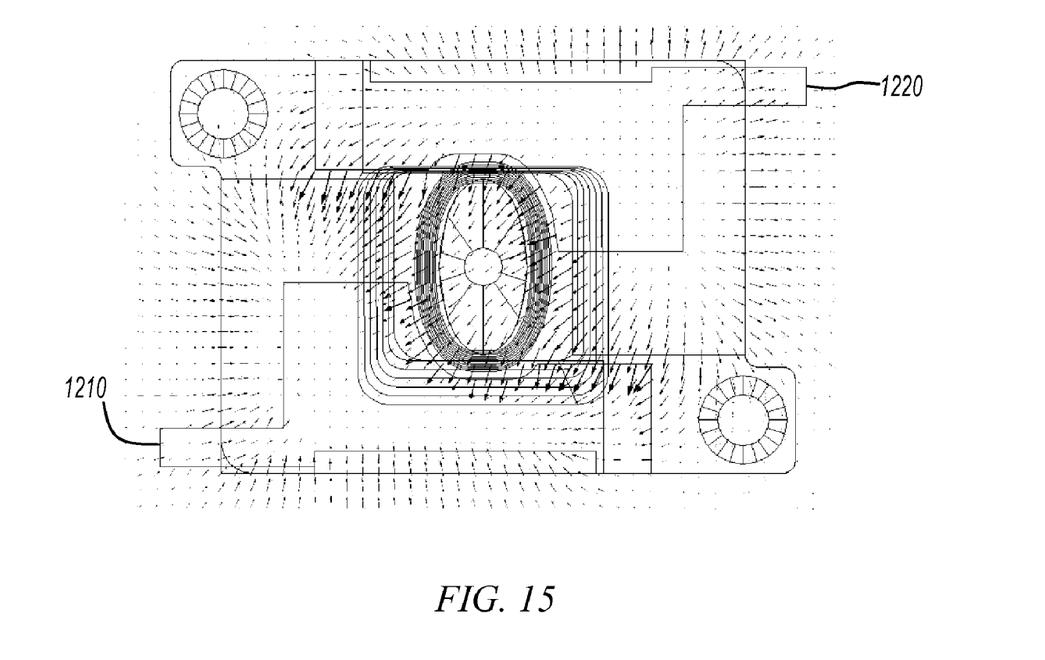
FIGS. 15-17 show magnetic fields in the magnetically actuated system of FIG. 14.

Core 930 is made from a magnetically permeable material such as steel. Core 930 is positioned between magnets 910 and 920 beneath the conductive coil. Conductive coil 112 has an inner outline and an outer outline when viewed from above. In some embodiments, when viewed from above, core 930 is entirely within the inner outline of conductive coil 112. An example cross-section that illustrates this relationship is shown in FIG. 15.

Core 930 provides a lower reluctance path for the magnetic field, so the magnetic field passing through conductive coil 112 tends to enter and exit core 930 (and the inner outline of the core) at closer to 90 degrees. This provides more drive torque for a given magnetic field strength.

Magnets 910 and 920 are shown generally having an "L" shape, but this is not a limitation of the present invention. In some embodiments, magnets 910 and 920 are triangular, and in other embodiments, magnets 910 and 920 are rectangular. Magnets 910 and 920 are mounted to base plate 902. In some embodiments, base plate 902 is made of a magnetically permeable material to aid in "closing" the magnetic circuit, although this is not a limitation of the present invention.

Figure 10:
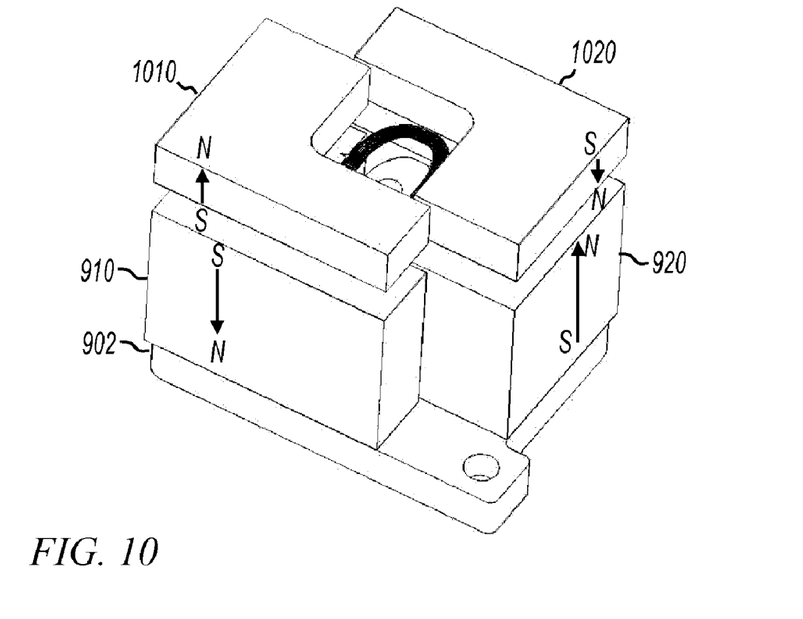

FIG. 10 shows a perspective view of the magnetically actuated system of FIG. 9 with two additional magnets. Magnets 1010 and 1020 form an upper B-field apparatus such as upper B-field apparatus 150 (FIG. 1). Magnets 1010 and 1020 are placed above the platform plane with magnetic orientations parallel to the magnetic orientation of magnets 910 and 920. For example, magnet 1010 has a south pole facing down and a north pole facing up, and magnet 1020 has a north pole facing down and a south pole facing up.

Magnets 1010 and 910 form a top/bottom magnet pair with south poles facing each other, and magnets 920 and 1020 form a top/bottom magnet pair with north poles facing each other. As shown in later figures, magnetic flux lines emerge from the north poles of magnets 920 and 1020, pass through the conductive coil, and enter the south poles of magnets 910 and 1010.

Magnets 1010 and 1020 are oriented to allow light to enter from above. In some embodiments, a reflective part (e.g., mirror 216, FIG. 2) is positioned within conductive coil 112, and is used to reflect the light that enters from above. Magnets 1010 and 1020 are shown as "L" shaped, but this is not a limitation of the present invention. In some embodiments, any shape that allows light to enter may be used. In other embodiments, for example in magnetically actuated systems not related to light reflection, magnets 1010 and 1020 may be placed partially or completely above the conductive coil.

Figure 11:
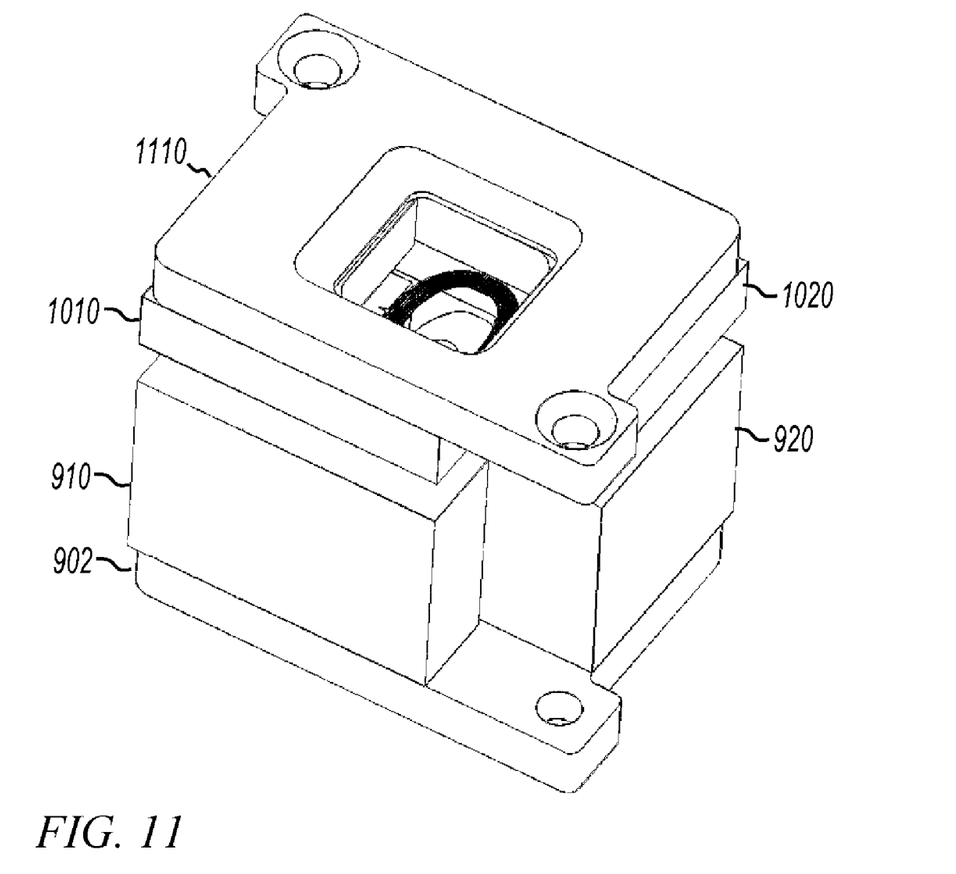

FIG. 11 shows a perspective view of the magnetically actuated system of FIG. 10 with the addition of a top plate. In some embodiments, top plate 1110 is made of a magnetically permeable material to aid in "closing" the magnetic circuit, although this is not a limitation of the present invention. Further, top plate 1110 includes a hole above the conductive coil to allow light to enter. In embodiments represented by FIG. 11, light can enter through the hole in top plate 1110 and be reflected at various angles that depend on a current driven through the conductive coil.

Figure 12:
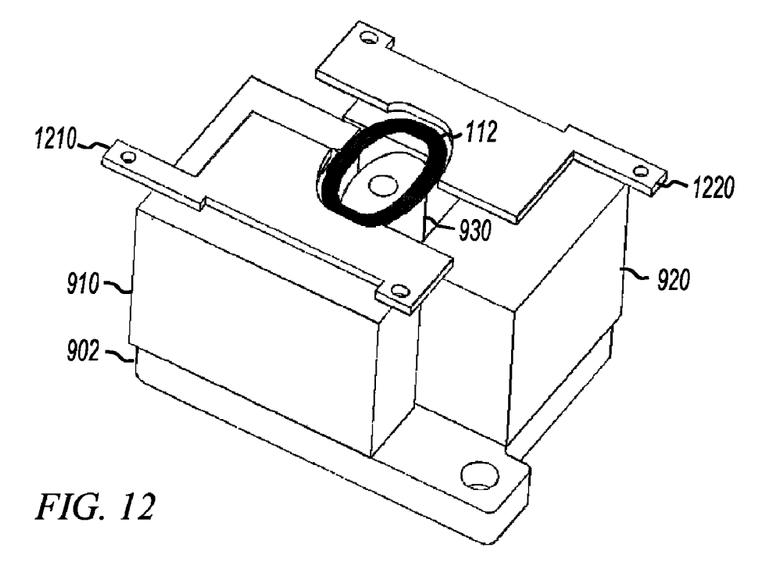
FIGS. 12-14 show perspective views of various magnetically actuated systems with multiple magnets and magnetic field focusing plates.

FIG. 12 shows show a perspective view of a magnetically actuated system with multiple magnets and magnetic field focusing plates. FIG. 12 shows magnets 910 and 920, core 930, base plate 902, and conductive coil 112, all of which are described above with reference to FIG. 9. FIG. 12 also shows focusing plates 1210 and 1220.

Focusing plates 1210 and 1220 are made from a magnetically permeable material and placed at or above the platform plane outside the outer outline of the conductive coil. This placement provides a low reluctance path for the magnetic field near areas of the coil where high B-field strength is desired.

As shown in FIG. 12, focusing plates 1210 and 1220 may be used in conjunction with core 930, although this is not a limitation of the present invention. For example, in some embodiments, focusing plates 1210 and 1220 are used in systems that do not include core 930. Also for example, in some embodiments, focusing plates 1210 and 1220 are used in system with three magnets beneath the platform plane, such as the embodiments shown in FIG. 3.

Figure 13:
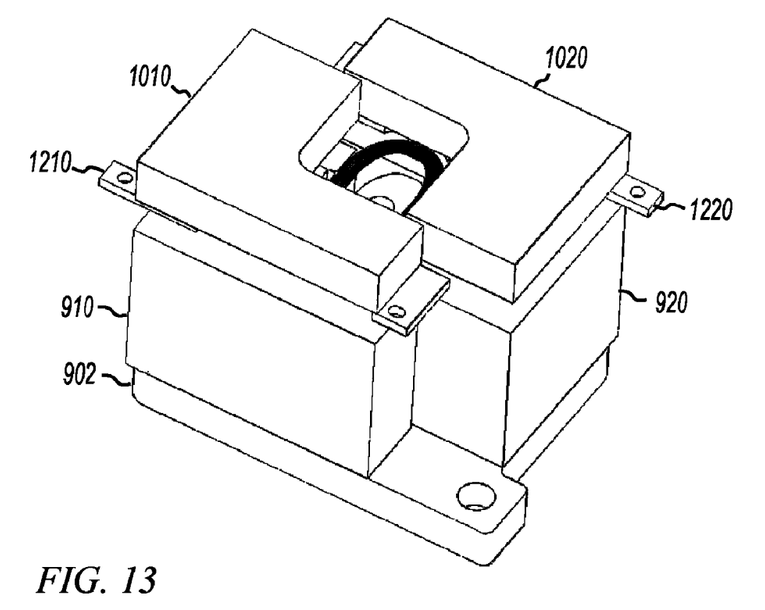

FIG. 13 shows magnets 1010 and 1020 placed above focusing plates 1210 and 1220. The combination of magnets 1010 and 1020 and focusing plates 1210 and 1220 form an upper B-field apparatus such as upper B-field apparatus 150 (FIG. 1). Magnets 1010 and 1020 are described above with reference to FIG. 10.

Figure 14:
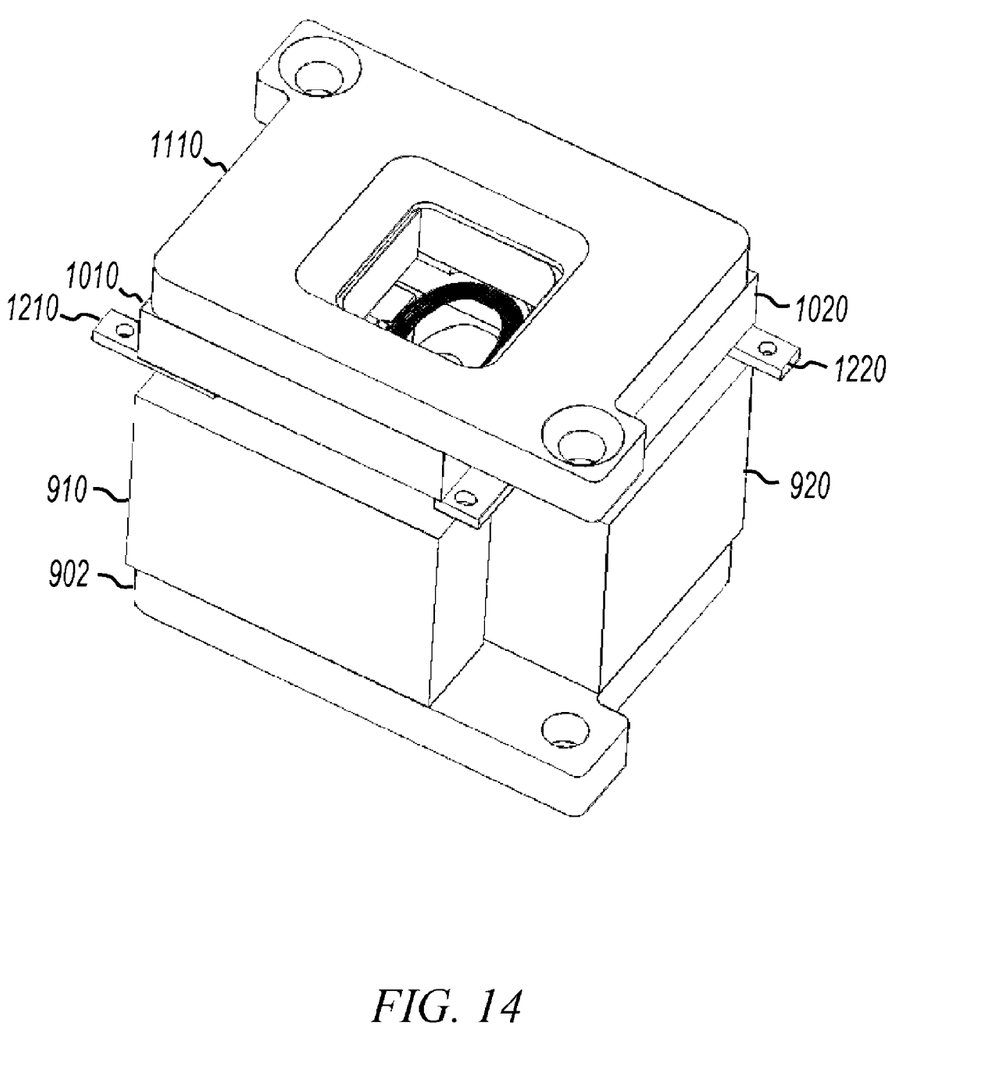

FIG. 14 shows top plate 1110 placed above magnets 1010 and 1020. Top plate 1110 is described above with reference to FIG. 11. The difference between FIG. 11 and FIG. 14 is the addition of focusing plates 1210 and 1220.

Figure 16:
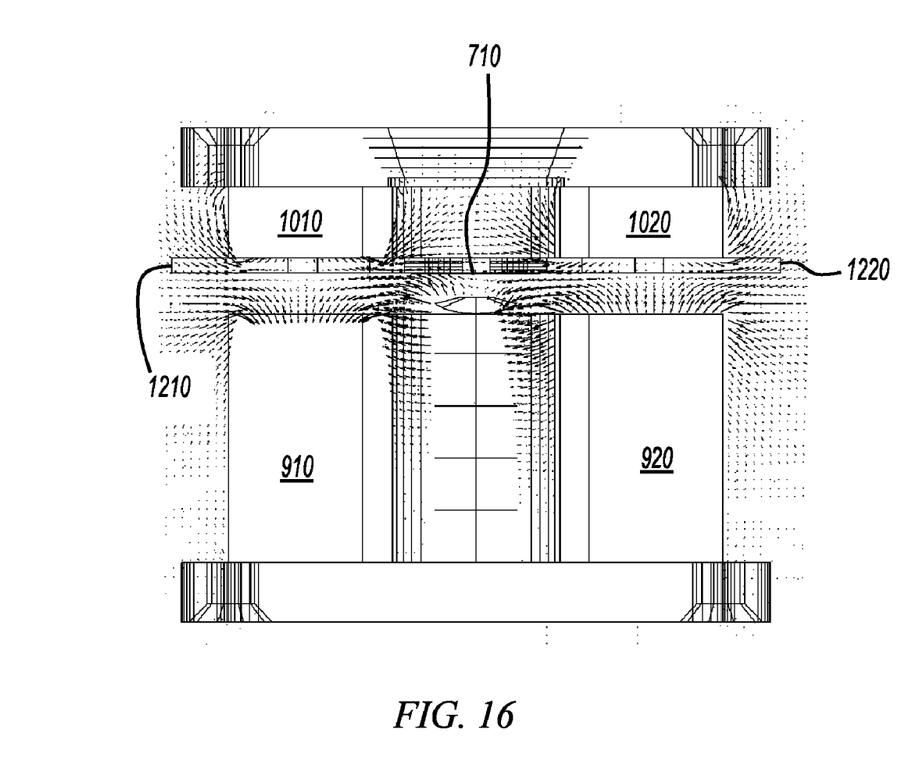
Figure 17:
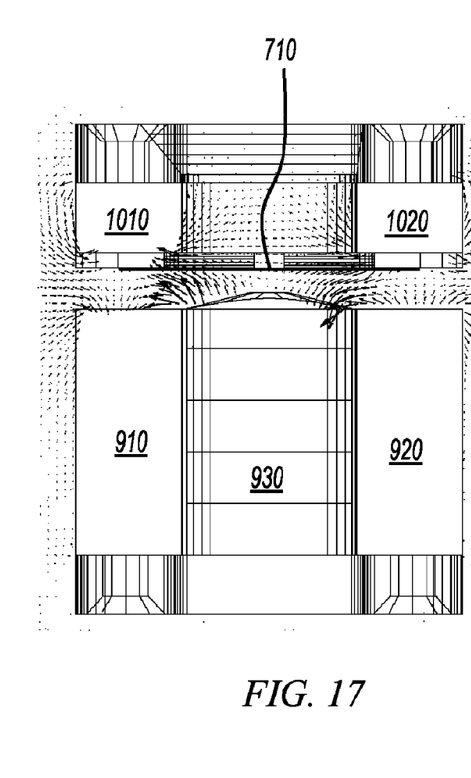

FIGS. 15-17 show magnetic fields in the magnetically actuated system of FIG. 14. FIG. 15 is a top view, and FIGS. 16 and 17 are side views. In the top view of FIG. 15, magnetic flux lines in the platform plane are shown. Accordingly, the arrows show the strength and orientation of the magnetic field that contributes to drive torque. As can be seen by the flux lines in FIG. 15, the magnetic field is focused by the focusing plates and the permeable core to be more perpendicular to the conductive coil in more places. Accordingly, more of the available B-field contributes to drive torque.

FIGS. 16 and 17 show magnetic flux lines relative to the platform plane. The platform plane is shown at 710 just below the focusing plates. As can be seen in FIGS. 16 and 17, the flux lines are substantially parallel to the platform plane when crossing the conductive coil.

Figure 18:
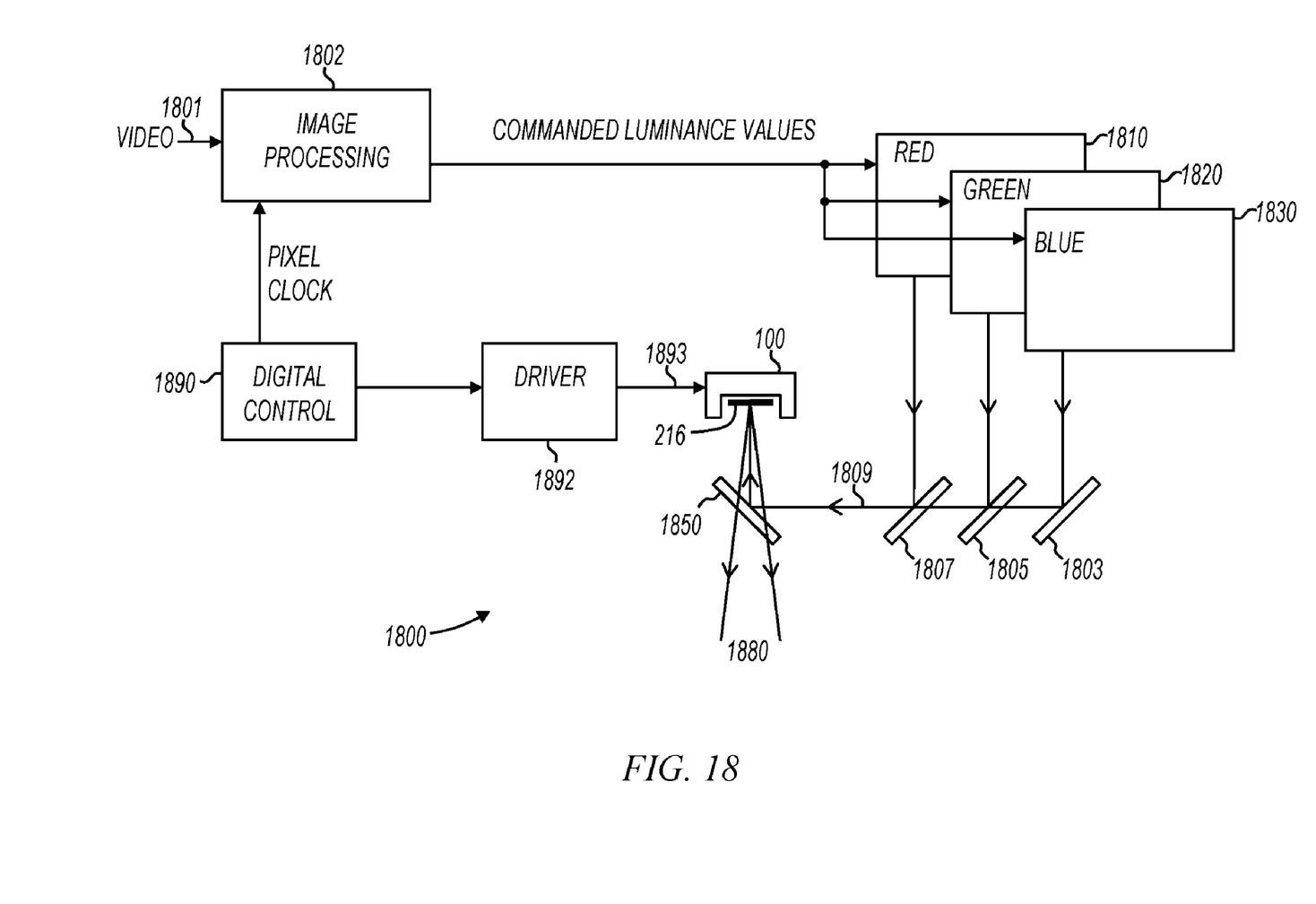
FIG. 18 shows a color laser projection apparatus.

FIG. 18 shows a color laser projection apparatus. System 1800 includes image processing component 1802, laser light sources 1810, 1820, and 1830. Projection system 1800 also includes mirrors 1803, 1805, and 1807, filter/polarizer 1850, magnetically actuated system 100, mirror 216, driver 1892, and digital control component 1890.

In operation, image processing component 1802 receives video data on node 1801, receives a pixel clock from digital control component 1890, and produces commanded luminance values to drive the laser light sources when pixels are to be displayed. Image processing component 1802 may include any suitable hardware and/or software useful to produce color luminance values from video data. For example, image processing component 1802 may include application specific integrated circuits (ASICs), one or more processors, or the like.

Laser light sources 1810, 1820, and 1830 receive commanded luminance values and produce light. Each light source produces a narrow beam of light which is directed to mirror 216 via guiding optics. For example, blue laser light source 1830 produces blue light which is reflected off mirror 1803 and is passed through mirrors 1805 and 1807; green laser light source 1820 produces green light which is reflected off mirror 1805 and is passed through mirror 1807; and red laser light source 1810 produces red light which is reflected off mirror 1807. At 1809, the red, green, and blue light are combined. The combined laser light is reflected off filter/polarizer 1850 on its way to mirror 216. After reflecting off mirror 216, the laser light passes through filter/polarizer 1850 to create an image at 1880.

In some embodiments, mirror 216 rotates on two axes in response to electrical stimuli received on node 1893 from driver 1892. For example, mirror 216 (FIG. 2) rotates on two axes in response to the interaction between current in conductive coil 112 and B-field 120.

Magnetically actuated system 100 may be any of the embodiments described herein. For example, system 100 may include any of the systems described with reference to FIGS. 3-17. Projector 1800 is described as an example application, and the various embodiments of the invention are not so limited. For example, the compact magnet assemblies described herein may be used with other mechanically actuated systems without departing from the scope of the present invention.

Figure 19:
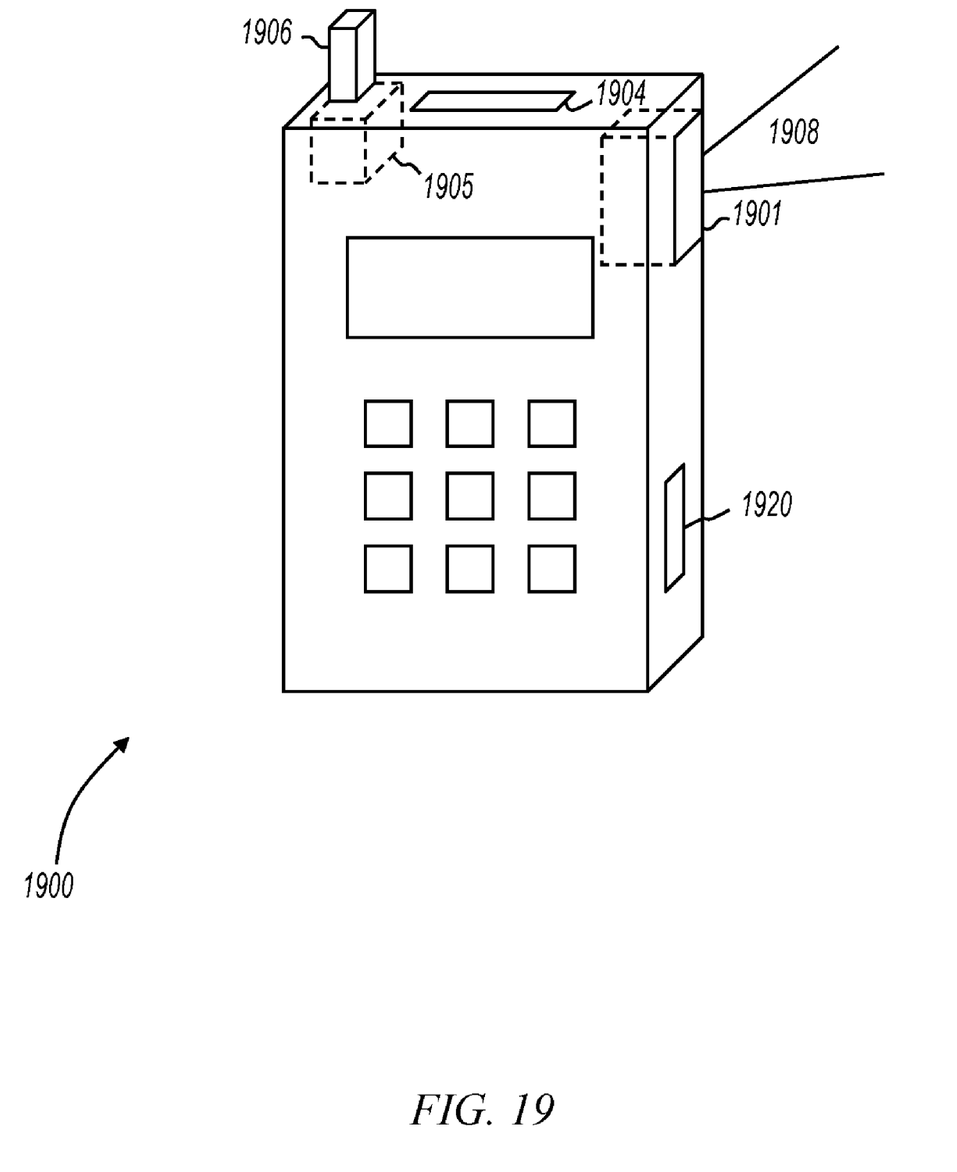
FIG. 19 shows a mobile device in accordance with various embodiments of the present invention.

FIG. 19 shows a mobile device in accordance with various embodiments of the present invention. Mobile device 1900 may be a hand held projection device with or without communications ability. For example, in some embodiments, mobile device 1900 may be a handheld projector with little or no other capabilities. Also for example, in some embodiments, mobile device 1900 may be a device usable for communications, including for example, a cellular phone, a smart phone, a personal digital assistant (PDA), a global positioning system (GPS) receiver, or the like. Further, mobile device 1900 may be connected to a larger network via a wireless (e.g., WiMax) or cellular connection, or this device can accept data messages or video content via an unregulated spectrum (e.g., WiFi) connection.

Mobile device 1900 includes scanning projection device 1901 to create an image with light 1908. Similar to other embodiments of projection systems described above, mobile device 1900 may include a projector with one or more magnetically actuated systems described above.

In some embodiments, mobile device 1900 includes antenna 1906 and electronic component 1905. In some embodiments, electronic component 1905 includes a receiver, and in other embodiments, electronic component 1905 includes a transceiver. For example, in global positioning system (GPS) embodiments, electronic component 1905 may be a GPS receiver. In these embodiments, the image displayed by scanning projection device 1901 may be related to the position of the mobile device. Also for example, electronic component 1905 may be a transceiver suitable for two-way communications. In these embodiments, mobile device 1900 may be a cellular telephone, a two-way radio, a network interface card (NIC), or the like.

Mobile device 1900 also includes memory card slot 1904. In some embodiments, a memory card inserted in memory card slot 1904 may provide a source for video data to be displayed by scanning projection device 1901. Memory card slot 1904 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Mobile device 1900 also includes data connector 1920. In some embodiments, data connector 1920 can be connected to one or more cables to receive analog or digital video data for projection by scanning projection device 1901. In other embodiments, data connector 1920 may mate directly with a connector on a device that sources video data.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
    a base plate comprising magnetically permeable material;
    a first magnet coupled to the baseplate, wherein the first magnet has a first magnetic orientation;
    a second magnet coupled to the baseplate, wherein the second magnet has a second magnetic orientation opposite and parallel the first magnetic orientation;
    a movable platform having a conductive coil nominally oriented in a platform plane above the first and second magnets, wherein the movable platform is not connected to any magnets;
    a magnetically permeable core beneath the movable platform and between the first and second magnets;
    a third magnet above the first magnet and the platform plane, wherein the third magnet has the second magnetic orientation; and
    a fourth magnet above the second magnet and the platform plane, wherein the fourth magnet has the first magnetic orientation;
    at least one focusing plate of magnetically permeable material positioned between the platform plane and the third and fourth magnets to focus a resulting magnetic field in the platform plane; and
    a top plate comprising magnetically permeable material above the third and fourth magnets, wherein the base plate and the top plate contribute to closing a magnetic circuit in the apparatus.

2. The apparatus of claim 1 wherein the movable platform includes a gimballed structure allowing the movable platform to rotate out of the platform plane on a first axis, the movable platform further including a reflective part that can rotate relative to the gimballed structure on a second axis substantially 90 degrees from the first axis.

3. The apparatus of claim 1, wherein the first magnet is oriented with a south pole facing down and a north pole facing up, and wherein the second magnet is oriented with a north pole facing down and a south pole facing up.

4. The apparatus of claim 1, wherein the third magnet is oriented with a south pole facing up and a north pole facing down, and wherein the fourth magnet is oriented with a south pole facing down and a north pole facing up.

5. The apparatus of claim 1, wherein the first and second magnets are substantially L-shaped.

6. The apparatus of claim 1, wherein the third and fourth magnets are substantially L-shaped and substantially circumscribe the conductive coil.

7. The apparatus of claim 1, wherein the conductive coil has an inner outline and the magnetically permeable core is oriented beneath, and within the inner outline of, the conductive coil.

8. The apparatus of claim 1 wherein the conductive coil has an outer outline and the at least one focusing plate is shaped to be outside the outer outline of the conductive coil.

9. The apparatus of claim 1, wherein the top plate circumscribes an opening above the conductive coil allowing light to enter and be reflected at various angles from the moveable platform.

10. The apparatus of claim 1 wherein the inner outline of the conductive coil is elliptical.

11. The apparatus of claim 1 wherein the movable platform includes a reflective surface facing up, and the third and fourth magnets are shaped to allow light to impinge on the reflective surface.

* * * * *